(12) United States Patent
Ozcan et al.

(10) Patent No.: US 7,716,210 B2
(45) Date of Patent: May 11, 2010

(54) METHOD AND APPARATUS FOR XML QUERY EVALUATION USING EARLY-OUTS AND MULTIPLE PASSES

(75) Inventors: Fatma Ozcan, San Jose, CA (US); Edison Lao Ting, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 11/613,944

(22) Filed: Dec. 20, 2006

(65) Prior Publication Data

US 2008/0154868 A1 Jun. 26, 2008

(51) Int. Cl.
*G06F 17/30* (2006.01)

(52) U.S. Cl. .................. 707/713; 707/718; 707/759; 707/765

(58) Field of Classification Search .............. 707/3, 707/101, 102, 2, 200
See application file for complete search history.

(56) References Cited

U.S. PATENT DOCUMENTS

| | | | | |
|---|---|---|---|---|
| 5,864,841 | A * | 1/1999 | Agrawal et al. | 707/2 |
| 6,738,755 | B1 | 5/2004 | Freytag et al. | |
| 6,829,606 | B2 | 12/2004 | Ripley | 707/5 |
| 6,947,927 | B2 | 9/2005 | Chaudhuri et al. | |
| 7,020,651 | B2 | 3/2006 | Ripley | 707/6 |
| 7,086,042 | B2 | 8/2006 | Abe et al. | |
| 7,107,282 | B1 | 9/2006 | Yalamanchi | |
| 7,146,352 | B2 * | 12/2006 | Brundage et al. | 707/2 |
| 7,275,056 | B2 * | 9/2007 | Cheng et al. | 707/4 |
| 7,315,852 | B2 | 1/2008 | Balmin et al. | |
| 7,451,144 | B1 * | 11/2008 | Koudas et al. | 707/6 |
| 7,480,856 | B2 * | 1/2009 | Jones | 715/234 |
| 7,490,110 | B2 * | 2/2009 | Ewen et al. | 707/200 |
| 7,565,342 | B2 * | 7/2009 | Fuh et al. | 707/2 |
| 2003/0084025 | A1 | 5/2003 | Zuzarte | |
| 2003/0163285 | A1 | 8/2003 | Nakamura et al. | |
| 2003/0200502 | A1 * | 10/2003 | Abe et al. | 715/500 |

(Continued)

OTHER PUBLICATIONS

Teubner et. al., "Loop-lifted staircase join: from XPath to XQuery", May 2005, Report INS-E0510, pp. 1-17.*

(Continued)

*Primary Examiner*—Shahid A Alam
*Assistant Examiner*—Rezwanul Mahmood
(74) *Attorney, Agent, or Firm*—Kunzler Needham Massey & Thorpe

(57) ABSTRACT

A method and apparatus is disclosed for XML query evaluation using early-outs and multiple passes to evaluate an XML query. A multi-pass evaluation procedure evaluates the XML query one step at a time as needed to complete evaluation. The multi-pass evaluation procedure evaluates XML queries containing logical expressions such as "AND" expressions, "OR" expressions, and implied "AND" expressions within "FOR" clauses. Queries containing logical expressions are often satisfied before every component is evaluated. Thus, executing the multi-pass evaluation procedure allows the evaluation to exit early when the veracity of the query is determined, not necessarily when every component has been evaluated. The multi-pass evaluation procedure executes as long as a descendant axis of the XML query need not be evaluated past a child node. When evaluation of a descendant axis past a child node is required, the multi-pass evaluation procedure may switch to a single-pass evaluation procedure to complete evaluation.

11 Claims, 3 Drawing Sheets

U.S. PATENT DOCUMENTS

| | | | |
|---|---|---|---|
| 2003/0212662 A1 | 11/2003 | Shin et al. | |
| 2003/0212664 A1* | 11/2003 | Breining et al. | 707/3 |
| 2003/0229617 A1 | 12/2003 | Rjaibi et al. | |
| 2004/0064466 A1* | 4/2004 | Manikutty et al. | 707/100 |
| 2004/0073546 A1* | 4/2004 | Forster et al. | 707/4 |
| 2004/0111396 A1 | 6/2004 | Musayev et al. | 707/3 |
| 2004/0153448 A1* | 8/2004 | Cheng et al. | 707/4 |
| 2004/0181521 A1 | 9/2004 | Simmen | |
| 2004/0205082 A1* | 10/2004 | Fontoura et al. | 707/101 |
| 2004/0236722 A1 | 11/2004 | Waas et al. | |
| 2004/0260675 A1 | 12/2004 | Bruno et al. | |
| 2004/0261019 A1 | 12/2004 | Imamura et al. | |
| 2005/0004892 A1* | 1/2005 | Brundage et al. | 707/3 |
| 2005/0022164 A1* | 1/2005 | Takacsi-Nagy | 717/117 |
| 2005/0050016 A1 | 3/2005 | Stanoi et al. | |
| 2005/0050030 A1* | 3/2005 | Gudbjartsson et al. | 707/3 |
| 2005/0091188 A1 | 4/2005 | Pal et al. | |
| 2005/0097078 A1 | 5/2005 | Lohman et al. | |
| 2005/0097084 A1 | 5/2005 | Balmin et al. | |
| 2005/0108209 A1* | 5/2005 | Beyer et al. | 707/3 |
| 2005/0131914 A1 | 6/2005 | Abdo et al. | |
| 2005/0203957 A1 | 9/2005 | Wang et al. | |
| 2005/0228779 A1 | 10/2005 | Chaudhuri et al. | |
| 2005/0229158 A1 | 10/2005 | Thusoo et al. | |
| 2005/0235356 A1 | 10/2005 | Wang | |
| 2005/0240624 A1* | 10/2005 | Ge et al. | 707/104.1 |
| 2005/0257201 A1* | 11/2005 | Rose et al. | 717/136 |
| 2005/0267866 A1 | 12/2005 | Markl et al. | |
| 2005/0283488 A1* | 12/2005 | Colossi et al. | 707/100 |
| 2006/0064432 A1 | 3/2006 | Pettovello | |
| 2006/0075000 A1 | 4/2006 | Kleewein et al. | |
| 2006/0106758 A1 | 5/2006 | Chen et al. | |
| 2006/0129524 A1* | 6/2006 | Levanoni et al. | 707/1 |
| 2006/0218194 A1 | 9/2006 | Yalamanchi | |
| 2006/0235839 A1* | 10/2006 | Krishnaprasad et al. | 707/4 |
| 2007/0005657 A1* | 1/2007 | Bohannon et al. | 707/200 |
| 2007/0043696 A1* | 2/2007 | Haas et al. | 707/2 |
| 2007/0208769 A1 | 9/2007 | Boehm et al. | |
| 2007/0233645 A1 | 10/2007 | Peterson et al. | |
| 2007/0245325 A1 | 10/2007 | Lapounov et al. | |
| 2007/0250473 A1 | 10/2007 | Larson et al. | |
| 2007/0299834 A1* | 12/2007 | Liu et al. | 707/4 |
| 2008/0091714 A1* | 4/2008 | Idicula et al. | 707/103 R |
| 2008/0114803 A1* | 5/2008 | Chinchwadkar et al. | 707/102 |
| 2008/0222187 A1* | 9/2008 | Beyer et al. | 707/102 |
| 2009/0119094 A1* | 5/2009 | Baba et al. | 704/9 |
| 2009/0138470 A1* | 5/2009 | Koudas et al. | 707/6 |
| 2009/0259641 A1* | 10/2009 | Balmin et al. | 707/4 |

OTHER PUBLICATIONS

Beyer et. al., "System RX: One Part Relational, One Part XML", 2005, ACM 1-59593-060, pp. 1-12.*
DeHaan et. al., "A Comprehensive XQuery to SQL Transition using Dynamic Interval Encoding", 2003, ACM 1-58113-634, pp. 1-12.*
Yang et. al., "2PXMiner—An Efficient Two Pass Mining of Frequent XML Query Patterns", 2004, ACM 1-588113-888, pp. 1-6.*
Balmin et. al., "On the Path to Efficient XML Queries", 2006, ACM 1-59593-385, pp. 1-12.*
Che et. al., "Query optimization in XML structured-document databases", 2006, The VLDB Journal, pp. 1-27.*
Ozcan et. al., "A Framework for Using Materialized XPath Views in XML Query Processing", 2004, 30th VLDB Conference, pp. 1-12.*
Krishnaprasad et. al., "Query Rewrite for XML in Oracle XML DB", 2004, 30th VLDB Conference, pp. 1-12.*
Balmin et al., "Grouping and Optimization of XPath Expressions in System RX".
Dunren et al., "Query Optimization in XML Structured-Document Databases", May 14, 2005.
Lukichev et al., "XML Query Algera for Cost-based Optimization", University of Saint-Petersburg.
Kader et al., "XQuery Optimization in Relational Database Systems".
"An Efficient Xpath Query Processor for XML Streams" Chen, Y.; Davidson, B.S.; Zheng, Y., IEEE 2006.
Freire et al., "A Flexible Infrastructure for Gathering XML Statistics and Estimating Query Cardinality," Proceedings of the 20 st Int'l Conference on Data Engineering, 2004.
Ramanath et al., "IMAX: Incremental Maintenance of Schema-Based XML Statistics," Proceedings of the 21st Int'l Conference on Data Engineering, 2005.
Beyer et al., "System RX: One Part Relational, One Part XML," SIGMOD 2005, Jun. 14-16, 2005, Baltimore, MD, USA.
McHugh et al., "Query Optimization for XML," Proc. of Very Large Data Bases, Edinburgh, U.K., 1999.
"Efficient Evaluation of Multiple Queries on Streaming XML Data" ACM Digital Library/INSPEC, Lee, M.L. et al.; 2002.
"WMS and GML based Interoperable Web Mapping System" ACM Digital Library/INSPEC, Shekhar et al.; 2001.
"XSQ: A Streaming Xpath Engine" ACM Digital Library, Peng, F. et al.; 2005.
"Multi-level Operator Combination in XML Query Processing" ACM Digital Library, Al-Khalifa, S. et al.; 2002.
"An XML Query Engine for Network-Bound Data" ACM Digital Library, Ives, Z.G. et al.; 2002.
"Query Optimization for XML*" McHugh, J. et al., Proceedings of the 25$^{th}$ VLDB Conference, Edinburgh, Scotland, 1999.
"TIMBER: A native XML database" Jagadish, H.V. et al., The VLDB Journal, 2002.
"Cost-based optimization in DB2 XML" Balmin, A. et al., IBM Systems Journal, vol. 45, No. 2, 2006.
"Cost-Sensitive Reordering of Navigational Primitives" Kanne, C.C. et al., ACM, 2005.
"Structural Join Order Selection for XML Query Optimization" Wu, Y. et al., IEEE 2003.

* cited by examiner

METHOD AND APPARATUS FOR XML QUERY EVALUATION USING EARLY-OUTS AND MULTIPLE PASSES

BACKGROUND OF THE INVENTION

1. Field of the Invention

This invention relates to extensible mark-up language (XML) and more particularly relates to XML query evaluation using early-outs and multiple passes.

2. Description of the Related Art

XPath and XQuery are two common languages used to query an XML document. XPath is a path expression language for selecting data within XML documents. XQuery is a language for querying, transforming, and constructing XML data. An expression is a string of unicode characters which may be constructed from keywords, symbols, and operands. XPath allows expressions to be nested. XQuery uses XPath expression syntax to address specific parts of an XML document and is semantically similar to structured query language (SQL). The SQL-like XQuery syntax uses "For," "Like," "Where," "Order by," and "Return" clauses in a "FLWOR" expression.

XPath analyzes an XML document as an XML tree by representing each element of the XML document as a node in the XML tree. The XML tree may include parent-child nodes that directly correspond to the nested elements in the XML document. For more information regarding XPath and XQuery please visit the proposed recommendations of W3C which currently reside at http://www.w3.org/TR/x/path20/ and http://www.w3.org/TR/xquery/ respectively.

A query, whether written using XPath or XQuery, is typically executed following a single-pass evaluation procedure, also referred to as a streamlined evaluation procedure. Using a single-pass evaluation procedure, all of the steps of the query are sequentially evaluated to gather all of the data in a single pass and thereby prevent re-traversals (i.e., subsequent traversals) through the XML document. However, certain queries may not need every step evaluated in order to qualify the XML document. The XML document is qualified when it meets the search criteria of the query.

One example is logical expressions such as an "AND" expression or an "OR" expression. For example, when one step or component of an "AND" expression is found to be false, the entire "AND" expression is false. Furthermore, when one step or component of an "OR" expression is found to be true, the entire "OR" expression is true. In these cases, query evaluation can exit early and avoid needlessly evaluating every step in the query. Similarly, a logical expression may include an XQuery "FLWOR" expression wherein the "For" clause contains an implied conjunction. As with typical "And" expressions, the implied conjunction is false if one component is false.

From the foregoing discussion, Applicants assert that a need exists for a method and apparatus that more efficiently evaluates XML queries. Beneficially, such a method and apparatus would selectively use a multi-pass evaluation procedure to evaluate XML documents.

SUMMARY OF THE INVENTION

The present invention has been developed in response to the present state of the art, and in particular, in response to the problems and needs in the art that have not yet been fully solved by currently available XML query evaluation methods and apparatus. Accordingly, the present invention has been developed to provide an XML query evaluation method and apparatus that overcome many or all of the above-discussed shortcomings in the art using early-outs and multiple passes.

A method of the present invention is presented for XML query evaluation using early-outs and multiple passes. The XML query may include logical expressions. The format of the XML query may be XPath expression language or XQuery query language. In one embodiment, the method includes rewriting an XML query that has multiple steps so that less selective steps of the XML query are evaluated after more selective steps. The method may also include selectively evaluating the steps in the rewritten XML query using a multi-pass evaluation procedure. The method may further include exiting the multi-pass evaluation procedure when an exitable logical expression is met. The exitable logical expression may be determined when the veracity of the XML query for a first predicate logically applies to the remaining predicates without evaluating the remaining steps of the XML query.

In a further embodiment, the method may include switching from the multi-pass evaluation procedure to a single-pass evaluation procedure when steps of the rewritten XML query require evaluation of a descendant axis past a child node. The method may also include deferring evaluation of the less selective steps in the XML query. This may occur when rewriting the query did not completely reorder the steps according to selectivity. Deferring evaluation of a step occurs so that more highly selective steps are evaluated before the less selective steps.

The method may switch from the multi-pass evaluation procedure to a single-pass evaluation procedure when steps of the rewritten XML query require evaluating a descendant axis below, or past, a child node, the single pass evaluation gathering sufficient data for the XML document to evaluate the rewritten XML query.

The method may include evaluating the next step in the next logical expression of the XML query when veracity of the current logical expression is determined but the veracity of the entire XML query has not been determined. The logical steps in the XML query may be steps within a logical expression.

An apparatus of the present invention is presented for XML query evaluation using early-outs and multiple passes. In one embodiment, the apparatus includes a rewrite module configured to rewrite an XML query that has multiple steps so that less selective steps of the XML query are evaluated after more selective steps. The apparatus may also include an evaluation module that selectively evaluates the steps in the rewritten XML query using a multi-pass evaluation procedure. The multi-pass evaluation procedure may evaluate a step of the XML query with each pass in the document. The evaluation module may use a single pass evaluation procedure to complete evaluation of the XML document when the step to be analyzed requires evaluation of a descendant axis step past the child node.

The apparatus may further include an exit module to exit the multi-pass evaluation procedure when an exitable condition is met. An exitable condition may exist when the veracity of the XML query for a first predicate logically applies to the remaining predicates without evaluating the remaining steps of the XML query. Thus, the exit module may exit the evaluation early.

In one embodiment, the evaluation module is configured to switch from the multi-pass evaluation procedure to a single-pass evaluation procedure when steps of the rewritten XML query require evaluation of a descendant axis below a child node. The single pass evaluation gathers sufficient data for the XML document to evaluate the rewritten XML query.

In a further embodiment, the evaluation module may further be configured to defer evaluation of the less selective steps in the XML query. This may occur when rewriting the query did not completely reorder the steps according to selectivity. Deferring evaluation of a step may occur to evaluate more highly selective steps before the less selective steps. The evaluation module may yet be further configured to evaluate the next step in the next logical expression of the XML query when veracity of the current logical expression is determined but the veracity of the entire XML query has not been determined. The logical steps in the XML query may be steps within a logical expression.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
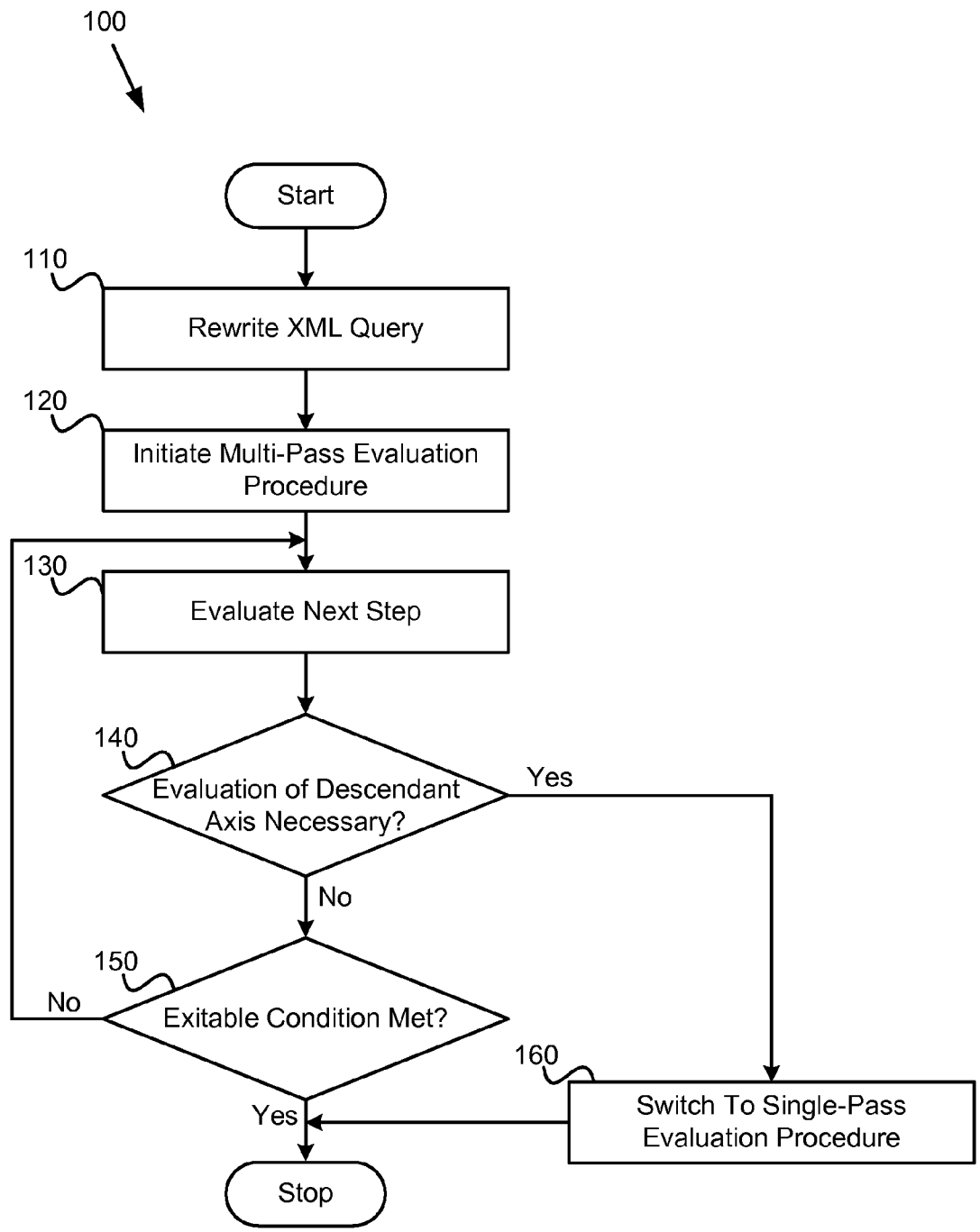
FIG. 1 is a schematic flow chart diagram illustrating one embodiment of an XML query evaluation method using early-outs and multiple passes in accordance with the present invention.

FIG. 1 depicts a schematic flow chart diagram illustrating one embodiment of an extensible markup language (XML) query evaluation method using early-outs and multiple passes in accordance with the present invention. The method may be embodied by a computer program product comprising a computer readable storage medium having computer usable program code having operations. The method 100 includes rewriting 110 an XML query, initiating 120 a multi-pass evaluation procedure, evaluating 130 a next step, determining 140 if evaluation of a descendant axis past a child node is necessary, determining 150 if an exitable condition is met, and switching 160 to a single-pass evaluation procedure. These steps may be performed by a processor executing instructions of a memory. The depicted method 100 facilitates XML query evaluation.

XPath and XQuery are two common languages used to query an XML document. XPath is a path expression language for selecting data within XML documents. XQuery is a language for querying, transforming, and constructing XML data. XQuery uses XPath expression syntax to address specific parts of the XML document and is semantically similar to structured query language (SQL).

An XML query may be written using XPath, XQuery, or similar XML query language. The XML query may be rewritten in order to achieve a more efficient ordering of the steps to be evaluated. A more efficient ordering may include placing more selective steps of the XML query in a position to be evaluated before less selective steps. The SQL-like XQuery syntax uses "FLWOR" expressions that may include "For," "Like," "Where," "Order by," and "Return" (i.e., FLWOR) clauses. XPath analyzes the XML document as an XML tree by representing each element of the XML document as a node in the XML tree. The XML tree may include parent-child nodes directly related to the nested elements in the XML document.

In one embodiment, rewriting 110 the XML query includes analyzing the XML query to determine step selectivity. The selectivity of a step may be inversely proportional to a number of elements or nodes of the XML document that are traversed to evaluate the step. A step may be a part of a path expression that generates a sequence of items and then filters the sequence by zero or more predicates. A predicate may include an expression enclosed in square brackets. An expression may be a string of Unicode characters. A step's selectivity is inversely related to an amount of matches or traversals through elements of an XML document that the step requires. Therefore, the more matches or traversals through elements or nodes of the XML document the step requires, the less selective the step is. A step of the XML query may be a component of the XML query that facilitates evaluation. For example, a simple XML query "/a[(.//b=3) OR (c=5)]" contains a step "/a," a step ".//b" where ".//b" is a descendant of "/a," and a step "/c" where "/c" is a child of "/a." The XML query may contain logical expressions. A logical expression may include "OR" and "AND" operators. In another embodiment, the XML query is written in XQuery and may contain a "FLWOR" expression wherein the "FOR" clause includes an implied "AND" expression that does not return a match.

Rewriting 110 the XML query may include analyzing the XML query to determine the manipulability of the steps. In one embodiment, rewriting 110 the XML query includes placing the less selective steps to be evaluated after the more selective steps. Step selectivity is inversely related to the number of elements reached by a specific navigation pattern through the XML document. The fewer the number of elements traversed in the XML document, the more selective the step is. For the simple XML query "/a[(.//b=3) OR (c=5)]," the "/c" step is more selective than the ".//b" step because the "/c" step terminates at "c" which is the child of "a," just one node removed. In contrast, the number of nodes requiring traversal to reach "b," a descendant of "a," is undetermined, but never zero. Therefore, in this example, it is never possible that evaluating "/c" will traverse through more elements or nodes than evaluating ".//b." Consequently, the "/c" step is more selective than the ".//b" step.

Rewriting 110 the XML involves organizing the steps, operators, order of evaluation operators, and operands of the expression such that more selective steps are evaluated before less selective steps. Typically, the XML query expressions, sub-expressions and operands can be reorganized because of the associative properties and commutative properties of the operators of the XML expressions. The order in which expressions and sub-expressions are evaluated depends on the evaluation protocol. Typically, expressions are evaluated based on the precedence of the operators and other indicators that control the order of operation. For example, in compound expressions the outer-most expression (typically indicated by "( )" or "[ ]" also referred to as order of evaluation operators) is evaluated before nested expressions found with in compound expression.

If the XML query is already written so that less selective steps are evaluated after more selective steps, then rewriting 110 the XML query may leave the XML query substantially unchanged. Rewriting the XML query may place as many of the less selective steps as possible in a position to be evaluated after the more selective steps, without altering the integrity of the XML query. For example, the simple XML query "/a[(.//b=3) OR (c=5)]" may be rewritten to "/a[(c=5) OR (.//b=3)]" since "/c" is more selective than ".//b" (i.e., evaluating ".//b" will always require as many or more traversals than evaluating "/c").

Initiating 120 the multi-pass evaluation procedure may include executing the evaluation procedure to evaluate the XML query against the XML document. The multi-pass evaluation procedure may pass through, or traverse, the XML document to evaluate an intended step. The multi-pass evaluation procedure evaluates one step on each pass. Alternatively, a multi-pass evaluation procedure may evaluate more than one step on each pass. In one embodiment, the multi-pass evaluation procedure may pass through the XML document multiple times for one XML query. In one embodiment, the multi-pass evaluation procedure facilitates exiting the procedure when a return value for the XML query is determined, not necessarily when every step of the XML query has been evaluated. For example, in the simple, rewritten XML query "/a[(c=5) OR (.//b=3)]," if evaluating "/a(c=5)" returns true, then evaluation of the query may be terminated without every step being evaluated because regardless of the result of the "/a(.//b=3)" the result for the whole XML query is still true.

Evaluating 130 the next step may include identifying the next step to be evaluated. In one embodiment, evaluating 130 the next step includes evaluating the first step if the step is the first step in the XML query. Evaluating 130 the next step may include traversing the XML document using the multi-pass evaluation procedure to pass through the elements or nodes identified by the next step. Evaluating 130 the next step may include comparing a value of a path with a value being searched.

In one embodiment, a status flag may be maintained to indicate the current status of the traversal. Similarly, an expression depth may be maintained to identify the number of steps evaluated in a current expression. The expression depth may be maintained to signify how many levels deep within a logical expression the step is. For example, in the rewritten simple XML query "/a[(c=5) OR (.//b=3)]," the method 100 may match the "/a" step. The logical expression "[(c=5) OR (.//b=3)] is reached where the next step, "/c," may be signified by incrementing an indicator such as "OR.CurrentNextStepIndex." For Example, if "OR.CurrentNextStepIndex" was initialized to "0," then upon evaluating 130 the next step, "/c," "OR.CurrentNextStepIndex" may be incremented to "1" and the "/c" step of the "OR" clause may be evaluated.

If the "c" node being evaluated has a value equal to "5," then "OR.CurrentStatus" may be set to "True" and the multi-pass evaluation procedure may exit early because the XML document qualifies against the XML query without requiring evaluation of the remaining components. However, if the "c" node being evaluated does not have a value equal to "5," then "OR.CurrentStatus" may be set to "False" and the multi-pass evaluation procedure continues to evaluate since there are unevaluated components. That is, "OR.CurrentNextStepIndex" may be incremented and the ".//b" step may be evaluated.

Determining 140 if evaluation of a descendant axis past a child node is necessary may include analyzing the semantics of the next step in the XML query. The descendant axis contains the descendants of the context node. The context node is the node currently being processed. So, evaluating the descendant axis past the child node would include evaluating more than one node removed from the context node (i.e., a child of the child of the context node and so on). The descendant axis may contain the descendants of a context node, such as "/a" in the rewritten simple XML query; a descendant may be a child or a child of a child and so on. Since the ".//b" step may require evaluating a descendant axis past (or lower in the hierarchy than) the child node, switching 160 to the single-pass evaluation procedure occurs.

The single-pass evaluation procedure may also be known as a streamlined evaluation procedure. In one embodiment, the single-pass evaluation procedure evaluates the entire XML document in a single pass, gathers the data, and matches the data against the XML query. Once the single-pass evaluation procedure is initiated, there may be no need to switch back to the multi-pass evaluation procedure.

If the method ascertains that evaluation of a descendant axis past a child node is not needed, for example if the next step was "/b" instead of ".//b," then "OR.CurrentNextStepIndex" may be incremented and the "/b" step may be evaluated. If the value associated with the "/b" step matched the value searched for, then "OR.CurrentStatus" may be set to "True." However, if the "/b" step did not match the value searched for, then "OR.CurrentStatus" would remain "False."

Determining 150 if an exitable condition has been met may include analyzing the entire XML query to determine if the XML query has been satisfied so the multi-pass evaluation procedure can exit. Evaluating every step of the XML query may not be necessary to determine if the XML document qualifies against the XML query since logical expressions may not require evaluation of every component for a valid determination because of the properties of the logical operators in the expressions.

Subsequent to determining 150 that an exitable condition has not been met, the method 100 returns to evaluating 130 the next step. If the next step is associated with a logical expression, evaluating 130 the next step may include analyzing the expression to determine if the expression may be terminated or if remaining components need to be evaluated. In one embodiment, if the expression is terminated, then the method identifies the next component to be evaluated. The next component to be evaluated may be a component of a logical expression. In another embodiment, the next component to be evaluated is not a component of a logical expression. If the expression is not satisfied, then evaluating 130 the next step may identify the next component of the expression to be evaluated.

In one embodiment, "OR.CurrentNextStepIndex" remains initialized at "0" for the first step of a logical expression, then is incremented for the first time upon evaluation of the second step of the logical expression. Additionally, a second status flag may be maintained to identify the status of evaluation of one logical expression inside of another logical expression. If the rewritten simple XML query is modified to "/a[(c=5 AND d=6) OR (.//b=3)]," so that there is an "AND" expression inside of the "OR" expression, then "OR.LEG.CurrentStatus" and "OR.LEG.CurrentNextStepIndex" may be maintained when evaluating the "AND" expression because it is a "leg" of the "OR" expression.

It may be appreciated that maintaining the "OR.LEG.CurrentStatus" may be similar in function to maintaining the "OR.CurrentStatus" such that when the "OR" expression is satisfied, the value is set to "True." Similarly, it may be appreciated that maintaining the "OR.LEG.CurrentNextStepIndex" may be similar in function to maintaining the "OR.CurrentNextStepIndex" such that when the next component in the "OR" expression is evaluated, the expression depth is incremented. The "CurrentNextStepIndex" expression depth may identify which step of which logical expression is being evaluated so the next step is easily identified.

Figure 2:
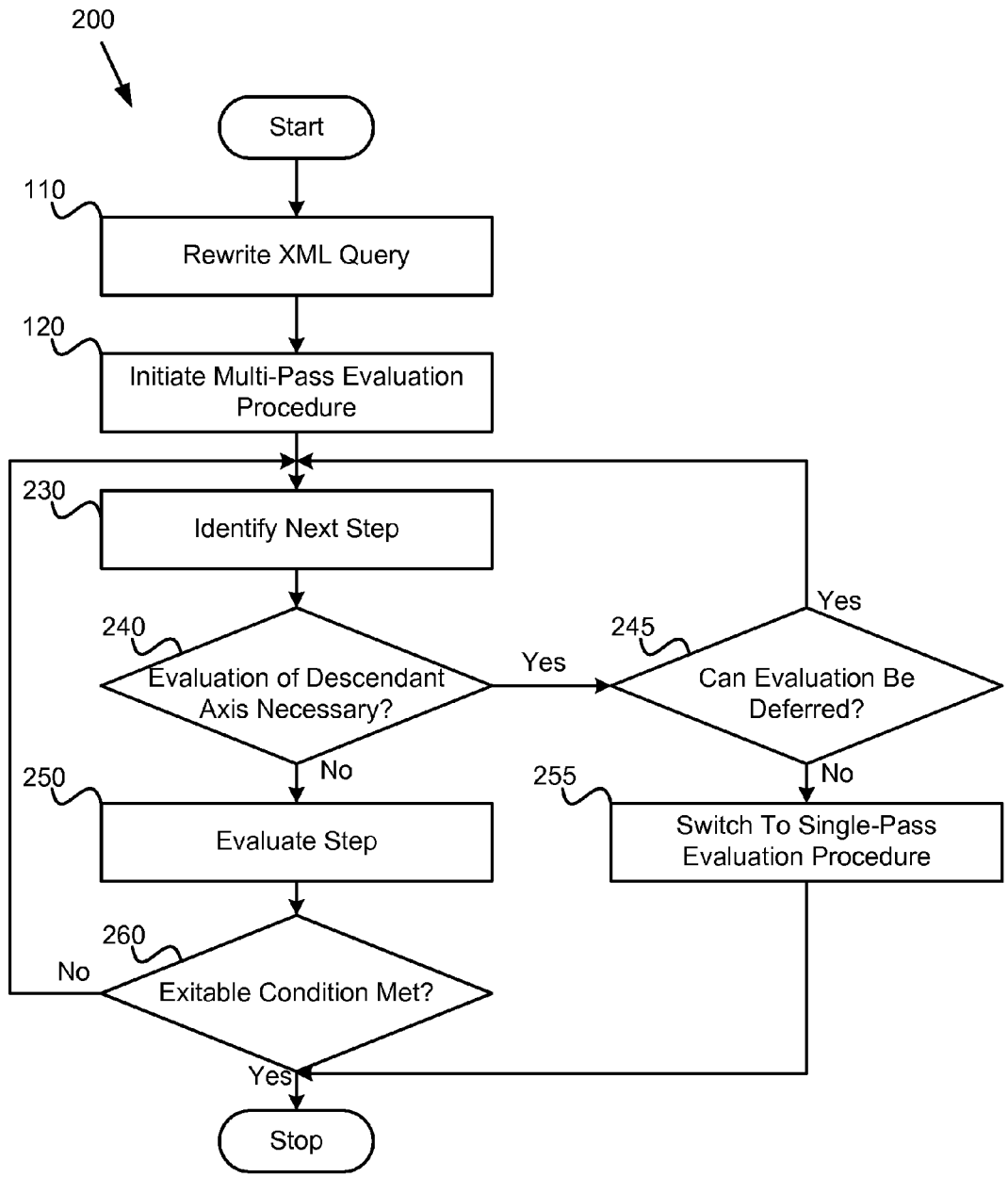
FIG. 2 is a schematic flow chart diagram illustrating one embodiment of an XML query evaluation method using early-outs and multiple passes in accordance with the present invention.

FIG. 2 depicts a schematic flow chart diagram illustrating one embodiment of an XML query evaluation method using early-outs and multiple passes in accordance with the present invention. The method 200 includes rewriting 110 an extensible mark-up language (XML) query, initiating 120 a multi-pass evaluation procedure, identifying 230 a next step, determining 240 if evaluation of a descendant axis past a child node is necessary, determining 245 if evaluation can be deferred, evaluating 250 the step, switching 255 to a single-pass evaluation procedure, and determining 260 if an exitable condition has been met. The depicted method 200 facilitates XML query evaluation in accordance with the present invention.

Identifying 230 the next step may include identifying the first step if the step is the first step in the XML query. In one embodiment, identifying 230 the next step includes analyzing the most recent component evaluated and determining if that component satisfies a relevant logical expression.

If the relevant logical expression may be terminated, then identifying 230 the next step may include locating the next logical expression to be evaluated and identifying the first component of the next logical expression to evaluate. If the relevant logical expression may not be terminated, then identifying 230 the next step may include locating the next component in that expression to be evaluated. In one embodiment, after identifying 230 the next step, the method proceeds to determining 240 if evaluation of a descendant axis past a child node is necessary. Determining 240 may include analyzing the semantics of the step in the XML query.

If the method ascertains that the next step does not require evaluation of a descendant axis past a child node, the method proceeds to evaluating 250 the step. In one embodiment, evaluating 250 the step includes traversing the XML document using the multi-pass evaluation procedure to pass through the elements or nodes identified by the step. Evaluating 250 the step may include comparing a value of a path with a value being searched. In one embodiment, a status flag may be maintained to indicate the current status of the traversal. Similarly, an expression depth may be maintained to identify the number of steps evaluated in a present evaluation. In one embodiment, the expression depth signifies how many levels deep within a logical expression the step is.

When a step has been evaluated, the veracity of the entire XML query may be determined if an exitable condition has been met. In one embodiment, determining 260 if an exitable condition has been met includes analyzing the entire XML query to determine if the query has been satisfied so the multi-pass evaluation procedure can exit. Evaluating every step of the XML query may not be necessary to determine the veracity of the XML query since logical expressions may not require evaluation of every component to reach a valid determination. If an exitable condition has not been met, then the method may return to identifying 230 the next step.

If a step requires evaluation of a descendant axis past a child node, the method proceeds to determining 245 if the evaluation can be deferred. Determining 245 if the evaluation can be deferred may include analyzing the XML query to determine if deferral is acceptable. In one embodiment, deferral is acceptable when all of the remaining steps are more selective than the current step. In certain embodiments, deferral is acceptable when the remaining steps include fewer less selective steps than highly selective steps. Deferral may not be acceptable when the remaining steps include fewer highly selective steps than less. In one embodiment, if further evaluation of only the highly selective steps could lead to evaluation completion, then deferring is considered acceptable regardless of the amount of less selective steps remaining to be evaluated.

If evaluation of the step can be deferred, then the multi-pass evaluation procedure may defer that step. If a step is deferred, the method 200 may return to identifying 230 the next step. If determining 245 that evaluation cannot be deferred, then switching to the single-pass evaluation procedure may include evaluating the entire XML document in a single pass, gathering the data, and matching the data against the XML query. Once the single-pass evaluation procedure is initiated, there may be no need to switch back to the multi-pass evaluation procedure.

Figure 3:
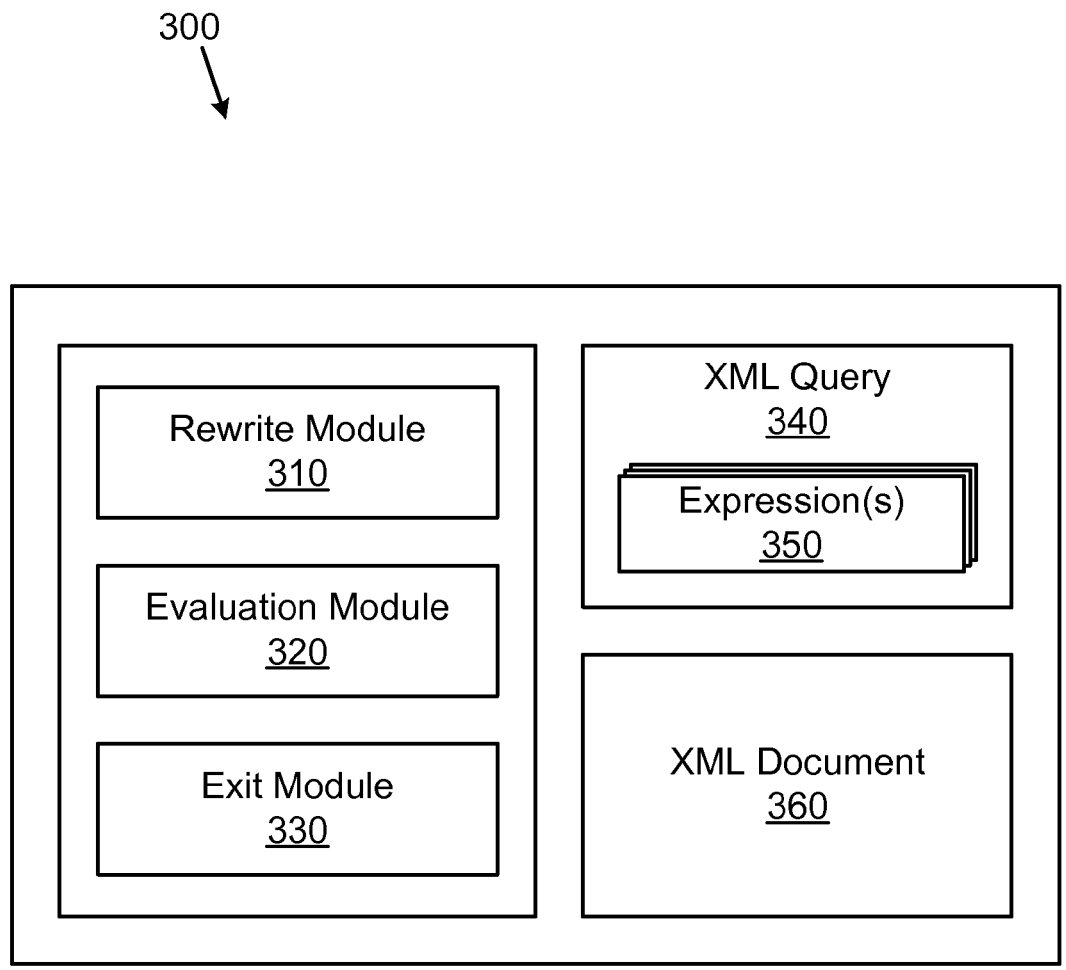
FIG. 3 is a schematic block diagram illustrating one embodiment of an XML environment for evaluating XML queries using early-outs and multiple passes in accordance with the present invention.

FIG. 3 depicts one embodiment of an XML environment for XML query evaluation using early-outs and multiple passes in accordance with the present invention. The XML environment 300 includes a rewrite module 310, an evaluation module 320, an exit module 330, an XML query 340, one or more expressions 350, and an XML document 360. The rewrite module 310, the evaluation module 320, and the exit module 330 may be embodied on a memory for execution by a processor. The depicted XML environment 300 is one embodiment for XML query evaluation using early-outs and multiple passes in accordance with the present invention.

The rewrite module 310 may rewrite the XML query 340. In one embodiment, the rewrite module 310 rewrites the XML query 340 in order of selectivity of steps, such that less selective steps are evaluated after more selective steps. The rewrite module may analyze the XML query 340 to ascertain whether a step is capable of being relocated within the XML query 340.

The evaluation module 320 may selectively evaluate the steps of the XML query 340. In one embodiment, the evaluation module 320 evaluates the steps of the XML query 340 using a multi-pass evaluation procedure. The multi-pass evaluation procedure may make a pass through the XML query 340 for each step of the XML query 340. The evaluation module 320 may switch to a single pass evaluation procedure when a step requiring evaluation of a descendant axis below a child node is reached. The multi-pass evaluation procedure may allow the evaluation module 320 to exit early when the veracity of the XML query has been determined; the execution may be conditional. But, when an entire sub-tree requires traversal such as when a descendant axis still must be evaluated, the execution is not conditional since the entire descendant axis must be evaluated; therefore, the single pass evaluation procedure is more efficient.

The exit module 330 may exit the multi-pass evaluation procedure when an exitable condition is met. An exitable condition may include completing evaluations of each step of the XML query 340. In one embodiment, the exit module 330 exits evaluation when the most recent step evaluated satisfies the XML query 340. The XML query 340 may be satisfied when each expression is satisfied, not necessarily when every component of the XML query 340 has been evaluated. Due, at least in part, to the properties of logic operators, a determination that an XML query 340 satisfies an expression can be made before all operands of the expression or subexepressions of the expression are evaluated.

The XML query 340 may be a search query with several locations and values to search for. These locations and values may be referred to as predicates of the query. The query 340 may be written in XML. The XML query 340 includes one or more expressions 350. An expression 350 may include one or more search predicates. In one embodiment, the expressions 350 include one or more logical expressions. A logical expression is an expression including either an "AND" or an "OR" clause. XPath is an expression language for addressing portions of the XML document 360. The index module 310 usually utilizes one or more expressions 350 to index the XML document 360.

The XML document 360 includes elements, which may be nested. In the XML document 360, the elements may be represented in a tree structure with parent-child relationships; each element may be represented as a node with a unique node identifier, further, the child may include the node identifier of the parent to facilitate traversing through the XML document 360. For example, a parent node may have the node identifier of "1," its children may have node identifiers of "1.x" where "x" increments with each child, their children may have node identifiers of "1.x.y" where "x" identifies the parent node and "y" increments with each child, and so on.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed for Extensible Mark-up Language ("XML") query evaluation using early-outs and multiple passes, the computer program product having operations comprising:

rewriting, by way of a processor executing instructions of a memory, an alterable XML query comprising multiple steps such that less selective steps of the XML query will be evaluated after more selective steps, wherein the XML query comprises logical expressions formatted according to one of an XPath expression language and an XQuery query language;

selectively evaluating the steps in the rewritten XML query using a multi-pass evaluation procedure to traverse the XML document, wherein the multi-pass evaluation procedure evaluates at least one step in the rewritten XML query with each pass through the XML document until veracity of the rewritten XML query is established; and exiting the multi-pass evaluation procedure in response to determining that an XML document meets an exitable condition of the XML query, the exitable condition comprising a determination that the veracity of the XML query for a first predicate logically applies to the remaining predicates without evaluating the remaining steps of the XML query.

2. The computer program product of claim 1, wherein the operations further comprise switching from the multi-pass evaluation procedure to a single-pass evaluation procedure when steps of the rewritten XML query require evaluating a descendant axis past a child node, the single pass evaluation gathering sufficient data for the XML document to evaluate the rewritten XML query.

3. The computer program product of claim 1, wherein the operations further comprise deferring evaluation of the less selective steps in the XML query, such that more highly selective steps are evaluated before the less selective steps.

4. The computer program product of claim 1, wherein the operations further comprise evaluating a next step of the XML query in response to determining a non-exitable condition is met.

5. The computer program product of claim 1, wherein an exitable condition comprises a logical "OR" expression of the XML query.

6. The computer program product of claim 1, wherein an exitable condition comprises a logical "AND" expression of the XML query.

7. The computer program product of claim 1, wherein an exitable condition comprises a logical expression associated with a "FOR" clause of the XML query, wherein the "FOR" clause returns no matches.

8. An apparatus for Extensible Mark-up Language ("XML") query evaluation using early-outs and multiple passes, the apparatus comprising:

a processor coupled to a memory, the memory comprising a rewrite module configured to rewrite an alterable XML query comprising multiple steps such that less selective steps of the XML query are evaluated after more selective steps, wherein the XML query comprises logical expressions formatted according to one of an XPath expression language and an XQuery query language;

an evaluation module configured to selectively evaluate the steps in the rewritten XML query using a multi-pass evaluation procedure to traverse the XML document, wherein the multi-pass evaluation procedure evaluates at least one step in the rewritten XML query with each pass through the XML document until veracity of the rewritten XML query is established; and an exit module configured to exit the multi-pass evaluation procedure in response to determining that an XML document meets an exitable condition of the XML query, the exitable condition comprising a determination that the veracity of the XML query for a first predicate logically applies to the remaining predicates without evaluating the remaining steps of the XML query.

9. The apparatus of claim 8, wherein the evaluation module is further configured to switch from the multi-pass evaluation procedure to a single-pass evaluation procedure when steps of the rewritten XML query require evaluation of a descendant axis below a child node, the single pass evaluation gathering sufficient data for the XML document to evaluate the rewritten XML query.

10. The apparatus of claim 8, wherein the evaluation module is further configured to defer evaluation of the less selective steps in the XML query, such that more highly selective steps are evaluated before the less selective steps.

11. The apparatus of claim 8, wherein the evaluation module is further configured to evaluate a next step of the XML query in response to determining a non-exitable condition is met.

* * * * *